United States Patent
Takahashi et al.

(10) Patent No.: US 10,172,036 B2
(45) Date of Patent: Jan. 1, 2019

(54) USER EQUIPMENT, BASE STATION, AND COMMUNICATION METHOD

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/575,535

(22) PCT Filed: May 18, 2016

(86) PCT No.: PCT/JP2016/064694
§ 371 (c)(1),
(2) Date: Nov. 20, 2017

(87) PCT Pub. No.: WO2016/190181
PCT Pub. Date: Dec. 1, 2016

(65) Prior Publication Data
US 2018/0132133 A1    May 10, 2018

(30) Foreign Application Priority Data
May 22, 2015 (JP) ................. 2015-104997

(51) Int. Cl.
*H04W 4/00* (2018.01)
*H04W 28/06* (2009.01)
(Continued)

(52) U.S. Cl.
CPC .......... *H04W 28/06* (2013.01); *H04L 1/1635* (2013.01); *H04L 29/10* (2013.01); *H04W 28/04* (2013.01); *H04W 80/06* (2013.01); *H04W 80/02* (2013.01)

(58) Field of Classification Search
CPC ..................................... H04W 28/06
See application file for complete search history.

(56) References Cited

U.S. PATENT DOCUMENTS 6,338,131 B1    1/2002  Dillon
9,961,585 B2 *  5/2018  Szilagyi ............ H04W 28/0289
(Continued)

OTHER PUBLICATIONS

International Search Report issued in PCT/JP2016/064694 dated Aug. 9, 2016 (5 pages).
(Continued)

*Primary Examiner* — Gerald A Smarth
(74) *Attorney, Agent, or Firm* — Osha Liang LLP

(57) ABSTRACT

There is provided user equipment for communicating with a base station in a mobile communication system including the base station and the user equipment, the user equipment including a PDCP layer processor provided with a storage unit that receives and stores a plurality of acknowledgement signals to be transmitted to the base station; and an RLC layer processor that transmits, to the PDCP layer processor, a signal transmission grant signal that indicates that transmission of an uplink signal is allowed, wherein, upon receiving the signal transmission grant signal, the PDCP layer processor transmits, to the RLC layer processor, an acknowledgement signal that is received most recently among the plurality of acknowledgement signals.

12 Claims, 7 Drawing Sheets

(51) Int. Cl.
  *H04L 29/10* (2006.01)
  *H04W 28/04* (2009.01)
  *H04W 80/06* (2009.01)
  *H04L 1/16* (2006.01)
  *H04W 80/02* (2009.01)

(56) References Cited

U.S. PATENT DOCUMENTS

| | | | |
|---|---|---|---|
| 2001/0007137 A1 | 7/2001 | Suumaki et al. | |
| 2004/0052234 A1* | 3/2004 | Ameigeiras | H04L 1/1642 370/338 |
| 2007/0213058 A1* | 9/2007 | Shaheen | H04W 36/12 455/436 |
| 2010/0067483 A1* | 3/2010 | Ahluwalia | H04W 36/02 370/331 |
| 2011/0019643 A1* | 1/2011 | Kim | H04L 1/1867 370/331 |
| 2012/0142354 A1* | 6/2012 | Ahluwalia | H04W 36/0072 455/436 |
| 2014/0219236 A1* | 8/2014 | Uchino | H04W 28/14 370/329 |

OTHER PUBLICATIONS

Written Opinion of the International Searching Authority issued in PCT/JP2016/064694 dated Aug. 9, 2016 (7 pages).

3GPP TS 36.323 v12.3.0; "3rd Generation Partnership Project; Technical Specification Group Radio Access Network; Evolved Universal Terrestrial Radio Access (E-UTRA); Packet Data Convergence Protocol (PDCP) specification (Release 12)"; Mar. 2015 (33 pages).

3GPP TS 36.300 v12.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Mar. 2015 (251 pages).

3GPP TS 36.321 v12.5.0; "3rd Generation Partnership Project; Technical Specification Group Radio Access Network; Evolved Universal Terrestrial Radio Access (E-UTRA); Medium Access Control (MAC) protocol specification (Release 12)"; Mar. 2015 (77 pages).

Extended European Search Report issued in the counterpart European Patent Application No. 16799887.1, dated Oct. 9, 2018 (7 pages).

* cited by examiner

USER EQUIPMENT, BASE STATION, AND COMMUNICATION METHOD

TECHNICAL FIELD

The present invention relates to user equipment, a base station, and a communication method.

BACKGROUND ART

In a usual TCP (Transmission Control Protocol) operation, upon receiving acknowledgement (a TCP ACK packet) from a client, a server operates as if the server deemed that all the TCP packets were received up to a TCP packet with a sequence number indicated in an acknowledgement number (Acknowledgement Number) included in the acknowledgement.

Basically, a server transmits acknowledgement to a client each time a TCP packet is received from the client. Here, a technique has been known to reduce a number of acknowledgements to be transmitted from the server to the client (cf. Patent Document 1, for example).

According to Patent Document 1, for a case where multiple acknowledgements are to be transmitted to a client, a server discards an old acknowledgement, and transmits only a new acknowledgement to the client.

PRIOR ART DOCUMENT

Patent Document

Patent Document 1: U.S. Pat. No. 6,338,131 B1

SUMMARY OF INVENTION

Problem to be Solved by the Invention

A mobile communication system that supports the LTE (Long Term Evolution) relays various types of data transmitted and received between user equipment and a server by using radio communication. However, since radio capacity that can be used in the mobile communication system is limited, it is important to reduce, as much as possible, an amount of data to be transmitted and received by using radio signals.

Here, for example, it can be considered to reduce, by applying the technique described in Patent Document 1 to the mobile communication system, an amount of data to be relayed by using radio signals. However, the technique described in Patent Document 1 is intended for TCP communication in a general server and client; and it is not assumed to be applied to a mobile communication system that supports the LTE.

The disclosed technique has been developed in view of the above description; and an object is to provide the technique that allows to reduce an amount of data of radio signals to be transmitted between user equipment and a base station.

Means for Solving the Problem

User equipment according to the disclosed technology is for communicating with a base station in a mobile communication system including the base station and the user equipment, the user equipment including a PDCP layer processor provided with a storage unit that receives and stores a plurality of acknowledgement signals to be transmitted to the base station; and an RLC layer processor that transmits, to the PDCP layer processor, a signal transmission grant signal that indicates that transmission of an uplink signal is allowed, wherein, upon receiving the signal transmission grant signal, the PDCP layer processor transmits, to the RLC layer processor, an acknowledgement signal that is received most recently among the plurality of acknowledgement signals.

Advantage of the Invention

According to the disclosed technology, the technique is provided that allows to reduce an amount of data of radio signals to be transmitted between user equipment and a base station.

EMBODIMENTS OF THE INVENTION

Figure 1:
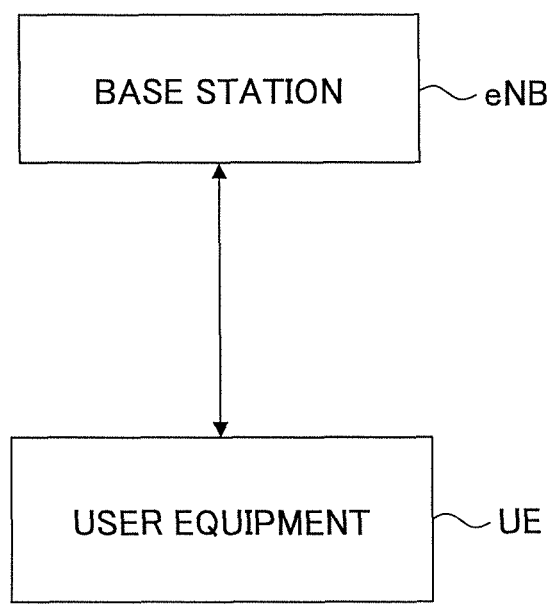
FIG. 1 is a diagram illustrating an example of a configuration of a mobile communication system according to an embodiment.

An embodiment of the present invention is described below by referring to the drawings. Note that the embodiment described below is merely an example, and embodiments to which the present invention is to be applied are not limited to the following embodiment. For example, it is assumed that a mobile communication system according to the embodiment is a system based on a scheme conforming to the LTE; however, the present invention is not limited to the LTE, and can be applied to another scheme. Note that, in the present specification and scope of the claims, "LTE" is used in a broad sense to refer not only to a communication scheme corresponding to Release 8 or 9 of the 3GPP, but also to a communication scheme corresponding to Release 10, 11, 12, or on or after Release 13.

Note that, in the following description, the processing procedure is described for a case where the TCP is used, as an example; however, it is not limited to this. The embodiment can be applied to another protocol, provided that the protocol is used for session management.

<System Configuration>

FIG. 1 is a diagram illustrating an example of a configuration of a communication system according to the embodiment. As illustrated in FIG. 1, the mobile communication system according to the embodiment includes user equipment UE and a base station eNB. In FIG. 1, one user equipment UE is depicted; however, it is for convenience of depiction, and a plurality of user equipment UEs may be included.

The user equipment UE includes a function for communicating with the base station eNB and so forth through radio. The user equipment UE may be, for example, a cellular phone; a smartphone; a tablet; a mobile router; a wearable terminal; a MTC (Machine Type Communication) terminal, and so forth. The user equipment UE may be any user equipment, provided that the device includes a communication function. The user equipment UE is formed of hardware resources, which are, for example, a CPU, such as a processor; a memory device, such as a ROM, a RAM, or a flash memory; an antenna for communicating with the base station eNB; an RF (Radio Frequency) device, and so forth. Each function and process of the user equipment UE may be implemented by processing or executing, by a processor, data and a program stored in a memory device. However, the user equipment UE is not limited to the above-described hardware configuration, and may include any other suitable hardware configuration.

The base station eNB executes communication between the user equipment UE and a core network. The base station eNB is formed of hardware resources, which are, for example, a CPU, such as a processor; a memory device, such as a ROM, a RAM, or a flash memory; an antenna for communicating with the user equipment UE, for example; a communication interface device for communicating, for example, with a neighboring base station, and so forth. Each function and process of the base station eNB may be implemented by processing or executing, by a processor, data and a program stored in a memory device. However, the base station eNB is not limited to the above-described hardware configuration, and may include any other suitable hardware configuration.

<Processing Procedure>

A processing procedure to be executed by the mobile communication system according to the embodiment is described below by using the figures. Note that, in the following description, the processing procedure is described for a case where the TCP is used, as an example; however, it is not limited to this.

(Processing Procedure for Each Layer)

Figure 2:
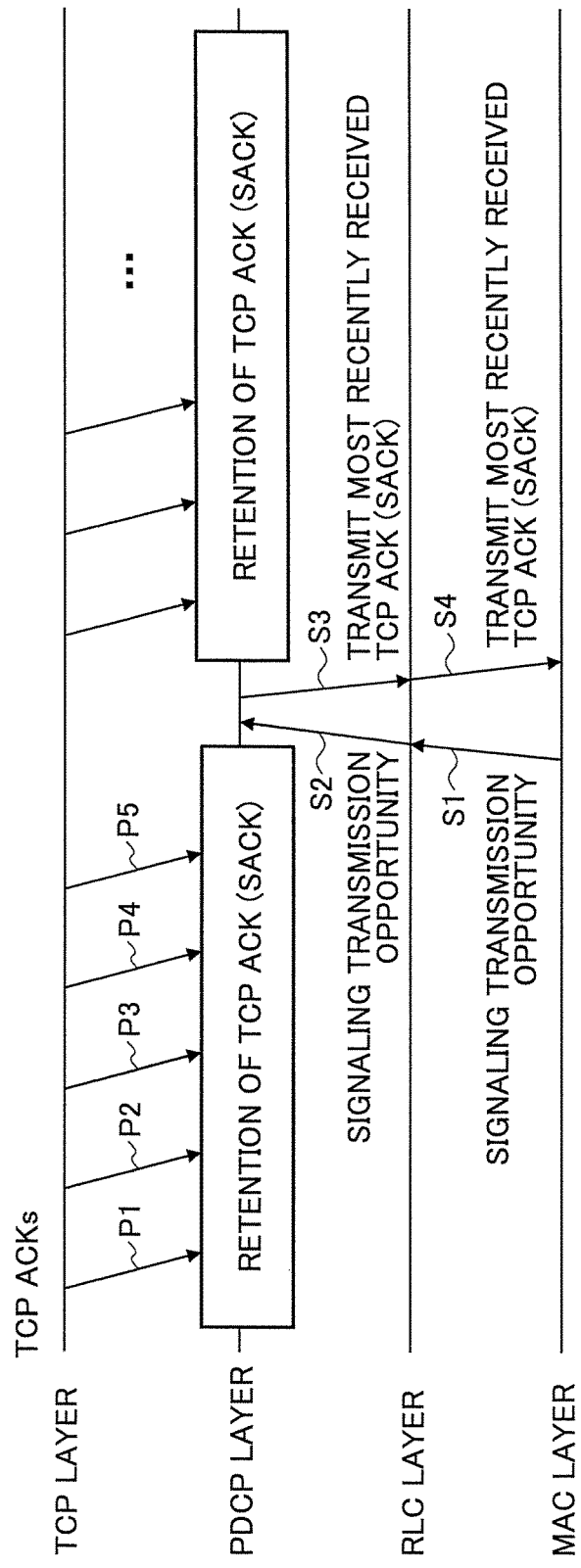
FIG. 2 is a diagram illustrating an example of a TCP process to be executed by user equipment according to the embodiment.

FIG. 2 is a diagram illustrating an example of a TCP process to be executed by the user equipment according to the embodiment. As illustrated in FIG. 2, the user equipment UE includes a MAC layer for executing a MAC (Media Access Control) process; a RLC layer for executing a RLC (Radio Link Control) process; a PDCP layer for executing a PDCP (Packet Data Convergence Protocol) process; and a TCP layer for executing a TCP process. Here, it is assumed that, in FIG. 2, the user equipment UE establishes a TCP connection with a server (not depicted) existing on a pre-determined PDN (Packet Data Network) connected to the mobile communication system according to the embodiment; and is communicating with the server by using the TCP.

First, the TCP layer passes, to the PDCP layer, a TCP ACK packet (which is referred to as the "ACK packet," hereinafter) to be transmitted to the server. Subsequently, the PDCP layer temporarily holds the ACK packet passed from the TCP layer in a buffer until receiving an instruction from the RLC layer.

Here, the MAC layer requests the base station eNB to allocate a radio resource in an uplink signal (UL (uplink) grant) so as to transmit uplink data. Upon receiving the UL grant from the base station eNB, the MAC layer transmits a transmission opportunity report to the RLC layer so as to report, to the RLC layer, that the resource of the uplink signal is allocated. The transmission opportunity report to be transmitted from the MAC layer to the RLC layer is, for example, a notification of a transmission opportunity.

Similarly, in order to report, to the PDCP layer, that the resource of the uplink signal is allocated, the RLC layer transmits a transmission opportunity report to the PDCP layer. The transmission opportunity report to be transmitted from the RLC layer to the PDCP layer is, for example, a Notification of a transmission opportunity.

Upon receiving the transmission opportunity report from the RLC layer, the PDCP layer stores an ACK packet in a PDCP PDU (Protocol Data Unit), and transmits it to the RLC layer. Here, for a case where a plurality of ACK packets exist in a buffer, the PDCP layer stores, in the PDCP PDU, only the ACK packet that is most recently received from the TCP layer, and transmits it to the RLC layer.

Subsequently, the RLC layer generates an RLC PDU from the PDCP PDU including the ACK packet, and transmits it to the MAC layer. The MAC layer transmits the RLC PDU to the base station eNB by using the radio resource indicated by UL grant.

A specific example is described by using FIG. 2. First, suppose that five ACK packets (P1 through P5) from the TCP layer are passed from the TCP layer to the PDCP layer. Furthermore, suppose that, in this state, a transmission opportunity report is transmitted from the MAC layer to the RLC layer (S1); and that the transmission opportunity report is further transmitted from the RLC layer to the MAC layer (S2).

In this case, the PDCP layer that has received the transmission opportunity report stores, among the five ACK packets, only the most recently received ACK packet (i.e., the ACK packet P5) in a PDCP PDU; and transmits it to the RLC layer (S3). Furthermore, the RLC layer generates an RLC PDU from the PDCP PDU including the ACK packet; and transmits it to the MAC layer (S4).

Here, the ACK packet includes an acknowledgement number. The acknowledgement numbers are, as defined in the specification of the TCP, numbers obtained by respectively adding 1 to sequence numbers of a series of TCP packets that could be received without defects, among the TCP packets that have already been received from the server by the user equipment UE. Thus, the acknowledgment number included in the ACK packet of P5 is, at least, greater than or equal to the acknowledgement numbers respectively included in the four ACK packets, which are P1 through P4.

Namely, if the server can receive the ACK packet of P5, the server can recognize that the TCP packets have been received up to that with the acknowledgement number included in the ACK packet. That is, it is not necessary for the server to receive the ACK packets from P1 to P4. Thus, upon receiving the transmission opportunity report, the PDCP layer only passes, to the RLC layer, the ACK packet that is received most recently from the TCP layer. Consequently, an amount of data of radio signals transmitted between the user equipment UE and the base station eNB can be reduced.

Furthermore, upon receiving a SACK (Selective ACK) packet from the TCP layer, the PDCP layer handles the SACK packet in a manner that is the same as that for the ACK packet. In other words, upon receiving the transmission opportunity report, the PDCP layer passes, to the RLC layer, only the ACK packet or the SACK packet that is most recently received from the TCP layer.

For example, if it is assumed in FIG. 2 that P1 through P4 are ACK packets, and that P5 is a SACK packet, the PDCP layer transmits, at step S3, the SACK packet P5 to the RLC layer. Additionally, for example, if it is assumed in FIG. 2 that P1 is a SACK packet, and that P2 through P5 are ACK packets, the PDCP layer transmits, at step S3, the ACK packet P5 to the RLC layer.

Note that, as specified in the TCP specification, a SACK includes, in addition to the above-described acknowledgement number, sequence numbers of the TCP packets that have already been received. By using the SACK, the user equipment UE is able to report, to the server, the sequence numbers of the TCP packets that have already been received, among the TCP packets with the sequence numbers on and after the acknowledgement number.

(Processing Procedure in the PDCP Layer)

Figure 3:
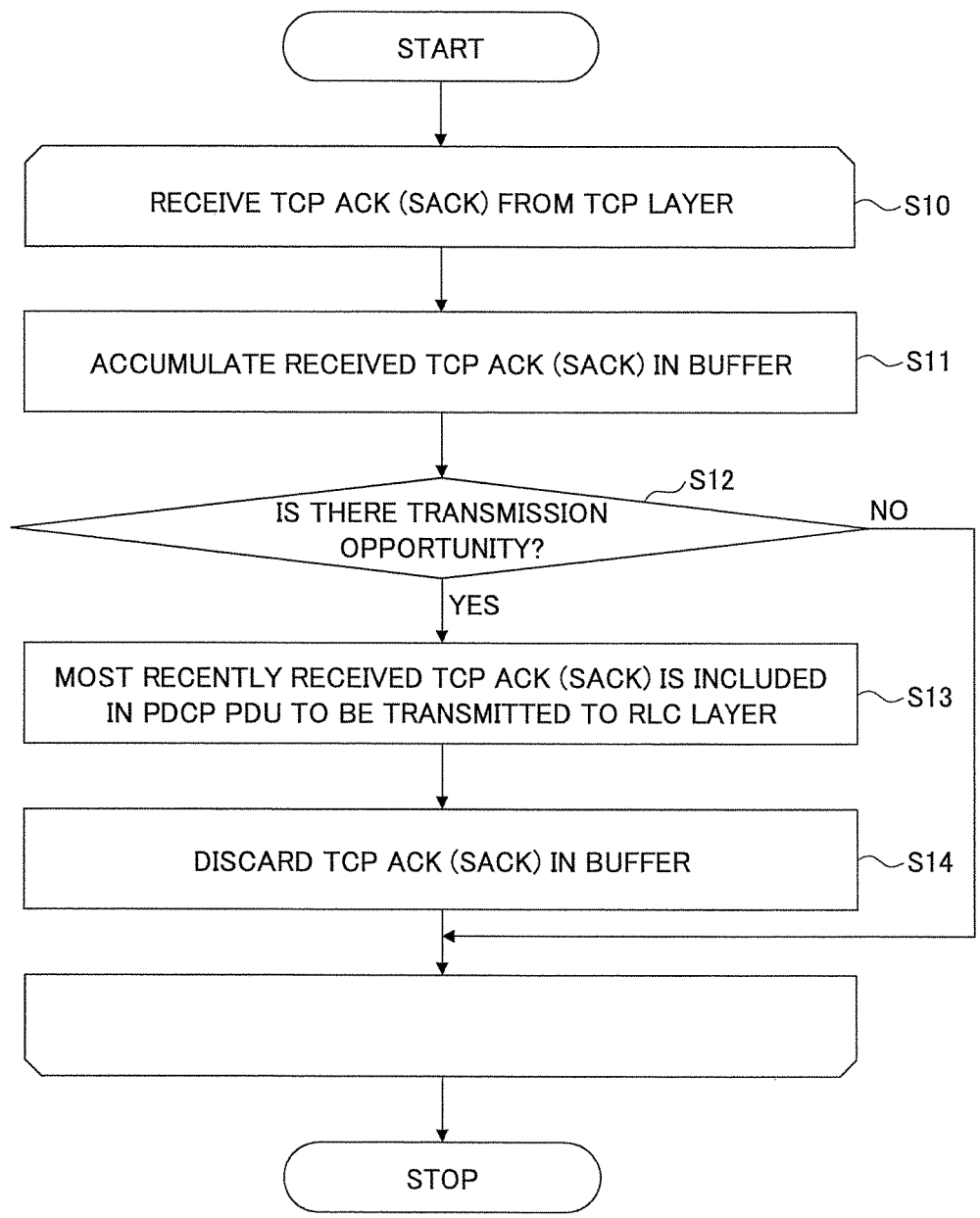
FIG. 3 is a flowchart illustrating an example of the TCP process to be executed by the user equipment according to the embodiment.

FIG. 3 is a flowchart illustrating an example of a TCP process to be executed by the user equipment according to the embodiment. By using FIG. 3, the processing procedure to be executed in the PDCP layer of the user equipment UE is specifically described. Note that, in FIG. 3, the processing procedure from step S10 to step S14 is to be repeated each time an ACK (SACK) packet is received by the PDCP layer.

At step S10, the PDCP layer receives an ACK (SACK) packet from the TCP layer.

At step S11, the PDCP layer accumulates the ACK (SACK) packet received from the TCP layer in a buffer. Note that the PDCP layer causes an order of receiving the ACK (SACK) packets from the TCP layer to be identifiable. For example, the PDCP layer may attach information indicating a receiving order to an ACK (SACK) packet, and stores it in a buffer; or may retain information recording, for example, a time stamp of receiving the ACK (SACK) packet.

At step S12, for a case where a transmission opportunity report is received from the RLC layer, the PDCP layer proceeds to the processing procedure of step S13. For a case where no transmission opportunity report is received, the process proceeds to the processing procedure of step S10.

At step S13, the PDCP layer transmits, to the RLC layer, the PDCP PDU including the most recently received ACK (SACK) packet, among the ACK (SACK) packets accumulated in the buffer. Note that, for a case where the information indicating the receiving order is attached to the ACK (SACK) packet at step S11, the PDCP layer transmits, to the RLC layer, the PDCP PDU including the ACK (SACK) packet, from which the information has been deleted. Here, the PDCP PDU to be transmitted to the RLC layer at step S13 may include, in addition to the ACK (SACK) packet, data to be transmitted to the base station eNB (e.g., uplink user data).

At step S14, the PDCP layer discards (deletes) all the ACK (SACK) packets accumulated in the buffer. Subsequently, the process proceeds to the processing procedure at step S10.

(Processing Sequence)

The user equipment UE according to the embodiment may execute the TCP process according to the embodiment (i.e., the TCP process illustrated in FIG. 2 and FIG. 3) based on an instruction from the base station eNB, instead of always executing it. Furthermore, the TCP process according to the embodiment may be executed in predetermined units.

Figure 4:
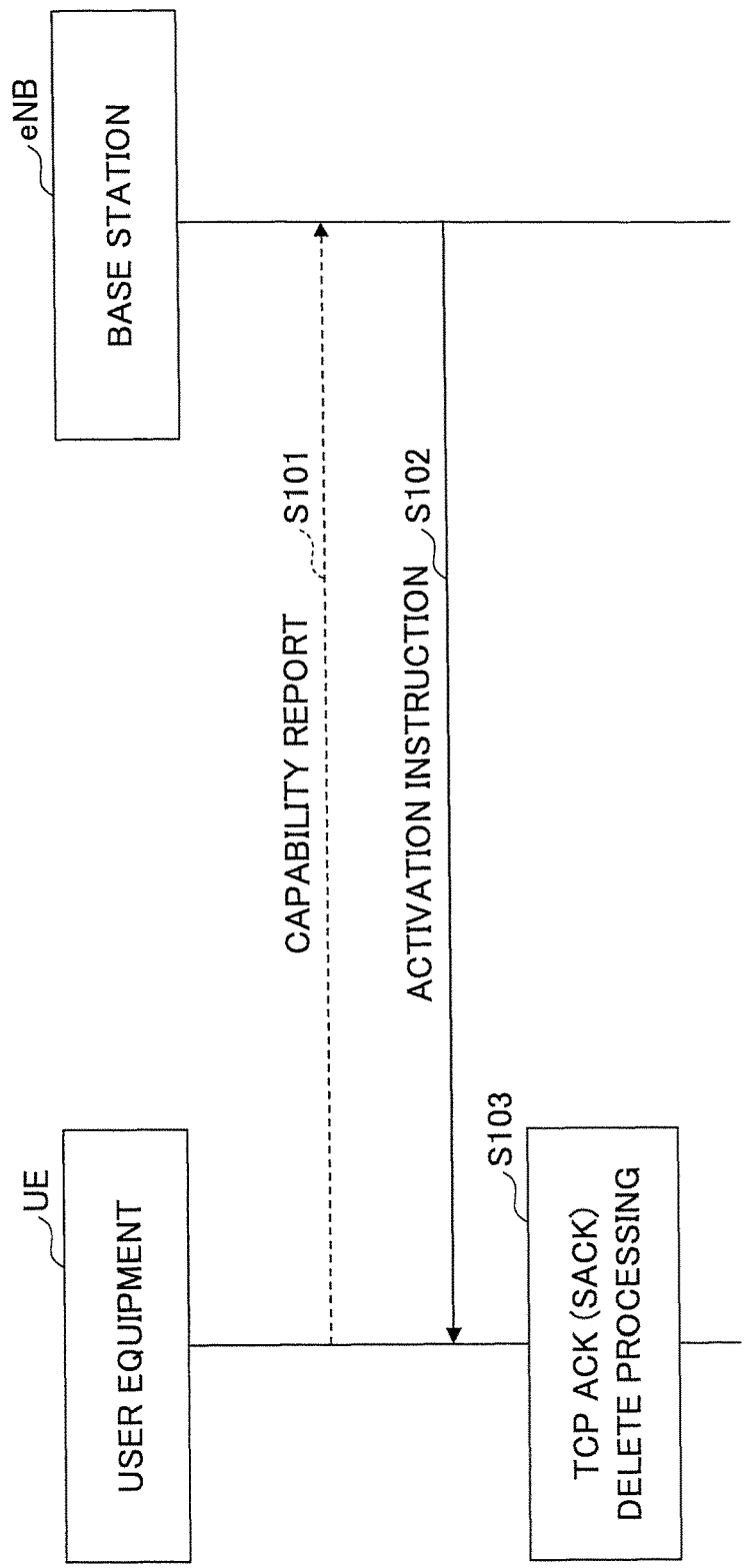
FIG. 4 is a sequence diagram illustrating an example of a processing procedure to be executed by a mobile communication system according to the embodiment.

FIG. 4 is a sequence diagram illustrating an example of the processing procedure to be executed by the mobile communication system according to the embodiment.

At step S101, the user equipment UE may transmit a capability report signal to the base station eNB. The capability report signal includes information (which is referred to as the "capability information," hereinafter) indicating that the user equipment UE itself includes processing capability for executing the TCP process according to the embodiment. The capability report signal may be, for example, an RRC signal (e.g., UE Capability Information), a MAC signal, or a physical layer signal.

Note that the capability information may include a specific number of radio bearers (DRB (Data Radio Bearer) number) or/and a number of logical channels that can simultaneously process the TCP process according to the embodiment. Additionally, the capability information may include a number of TCP sessions that can simultaneously execute the TCP process according to the embodiment. Furthermore, specific UE categories may be predetermined between the base station eNB and the user equipment UE; and the specific UE categories may be stored in the capability information. In this case, the base station eNB recognizes the processing capability of the user equipment UE itself (the number of radio bearers, the number of logical channels, or the number of the TCP sessions) based on the specific UE category.

At step S102, the base station eNB transmits an activation instruction signal to the user equipment UE, so that the user equipment UE is instructed to be caused to execute the TCP process according to the embodiment. Here, for transmitting the activation instruction signal from the base station eNB to the user equipment UE, a plurality of examples can be considered as follows.

EXAMPLE 1

In Units of User Equipment UEs

The base station eNB may instruct to operate the TCP process according to the embodiment in units of user equipment UEs. Note that to instruct in units of the user equipment UEs means to instruct predetermined user equipment UE to operate the TCP process according to the embodiment for all radio bearers (DRB). In this case, the activation instruction signal may be a RRC Connection Reconfiguration signal, or a predetermined MAC CE (Control Element) signal. Furthermore, an IE indicating as to whether the TCP process according to the embodiment is to be operated may be included in a RadioResourceConfigDedicated IE (Information Element), which is included in the RRC signal. Note that, the base station eNB may be arranged to transmit the activation instruction signal if, in the processing procedure at step S101, a report indicating that the user equipment UE has the processing capability to execute the TCP process according to the embodiment is received from the user equipment UE.

The user equipment UE that receives, at step S103, the activation instruction signal according to example 1 causes, in each of the TCP processes at the PDCP layers for all the radio bearers (DRB), the TCP process according to the embodiment to be processed.

EXAMPLE 2

In Units of Radio Bearers

The base station eNB may indicate, to the user equipment UE, one or more radio bearers for which the TCP processes according to the embodiment are to be operated, respectively. In this case, the activation instruction signal may be the RRC Connection Reconfiguration signal. Furthermore, in the RadioResourceConfigDedicated IE included in the RRC signal, the PDCP-Config that is specified for each DRB may include an IE indicating weather the TCP process according to the embodiment is to be operated. Additionally, an ID (e.g., the DRB Identity) for uniquely identifying a radio bearer, or a LCID (Logical Channel ID) for uniquely identifying a logical channel may be included in the MAC CE. Note that the base station eNB may specify one or more radio bearers for which the TCP processes according to the embodiment are to be operated, respectively, within the range of the processing capability (the number of the radio bearers or the number of the logical channels) reported from the user equipment UE in the processing procedure at step S101.

The user equipment UE that receives an activation instruction signal according to example 2 at step S103 causes the TCP process according to the embodiment to be operated for each of the TCP processes of the PDCP layers of the specified radio bearers (DRBs).

EXAMPLE 3

In Units of TCP Sessions

The base station eNB may indicate, to the user equipment UE, one or more TCP sessions which are caused to operate the TCP processes according to the embodiment, respectively. In this case, an activation instruction signal may include identifiers for uniquely identifying one or more TCP sessions (which are referred to as the "TCP session IDs," hereinafter), respectively. Additionally, the activation instruction signal may be the RRC Connection Reconfiguration signal, or the MAC CE. The TOP session ID may includes, for example, an IP address and a TCP port of the sender of the TCP packet, and an IP address and a TCP port of the sender of the TCP packet. Furthermore, the base station eNB may obtain the TCP session ID from the MME (Mobility Management Entity).

Note that, the base station eNB may indicate one or more TCP sessions which are to be caused to operate the TCP processes according to the embodiment, within the range of the processing capability (the number of the TCP sessions) reported from the user equipment UE in the processing procedure at step S101.

The user equipment UE that receives an activation instruction signal according to example 3 at step S103 may cause the TCP processes according to the embodiment to be operated during execution of the TCP communications of the respective TCP sessions, which are specified at the PDCP layers.

<Functional Configuration>

Subsequently, an example of functional configurations of the user equipment UE and the base station eNB for executing the above-described processing procedure is described.

(Base Station)

Figure 5:
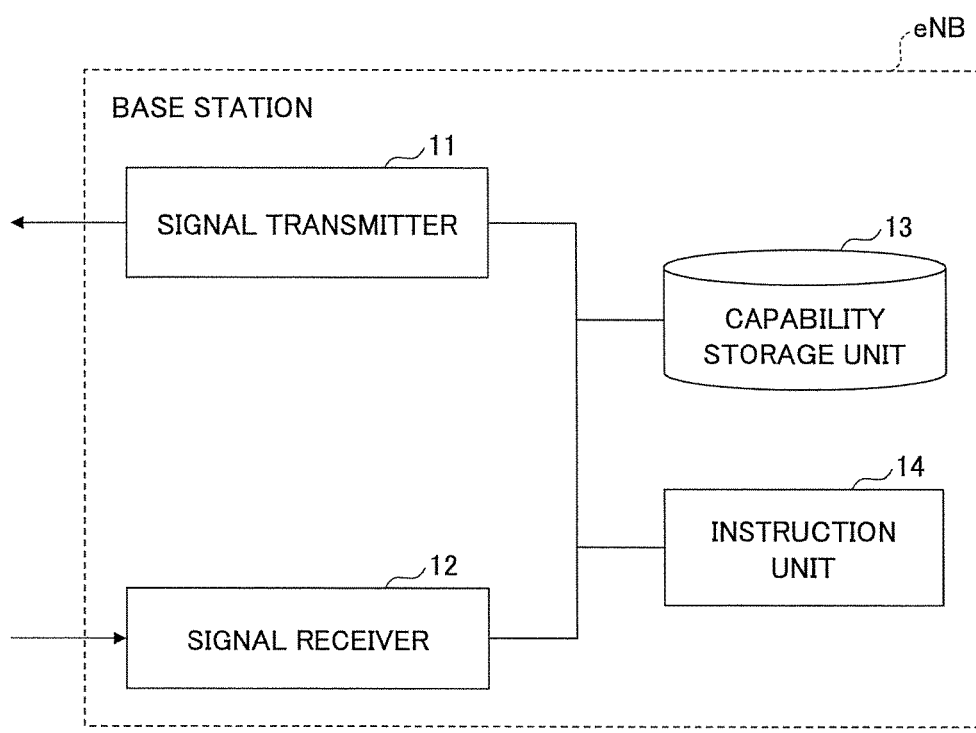
FIG. 5 is a diagram illustrating an example of a functional configuration of a base station according to the embodiment.

FIG. 5 is a diagram illustrating an example of the functional configuration of the base station according to the embodiment. As illustrated in FIG. 5, the base station eNB includes a signal transmitter 11; a signal receiver 12; a capability storage unit 13; and an instruction unit 14. Note that FIG. 5 only illustrates, in the base station eNB, functional units particularly related to the embodiment of of the present invention; and it is assumed that functions, which are not depicted, for executing at least operations conforming to the LTE are included. Furthermore, the functional configuration illustrated in FIG. 5 is merely an example. The functional division and the names of the functional units may be any division and names, provided that the operation according to the embodiment can be performed.

The signal transmitter 11 includes a function for generating various types of physical layer signals from upper layer signals to be transmitted from the base station eNB, and for wirelessly transmitting them.

The signal receiver 12 includes a function for wirelessly receiving various types of signals from the user equipment UE, and for retrieving upper layer signals from the received physical layer signals. Additionally, the signal receiver 12 receives the capability information from the user equipment UE, and stores it in the capability storage unit 13.

The capability storage unit 13 stores, for each user equipment UE, the capability information received by the signal receiver 12 in a memory.

The instruction unit 14 instructs the user equipment UE to be caused to operate the TCP process according to the embodiment. Note that the instruction unit 14 may instruct the user equipment UE to be caused to operate the TCP process according to the embodiment within the range of the processing capability of the user equipment UE, based on the capability information stored in the capability storage unit 13. Furthermore, the instruction unit 14 may instruct the user equipment UE to be caused to operate the TCP process according to the embodiment in units of user equipment UEs; in units of radio bearers; or in units of TCP sessions.

(User Equipment)

Figure 6:
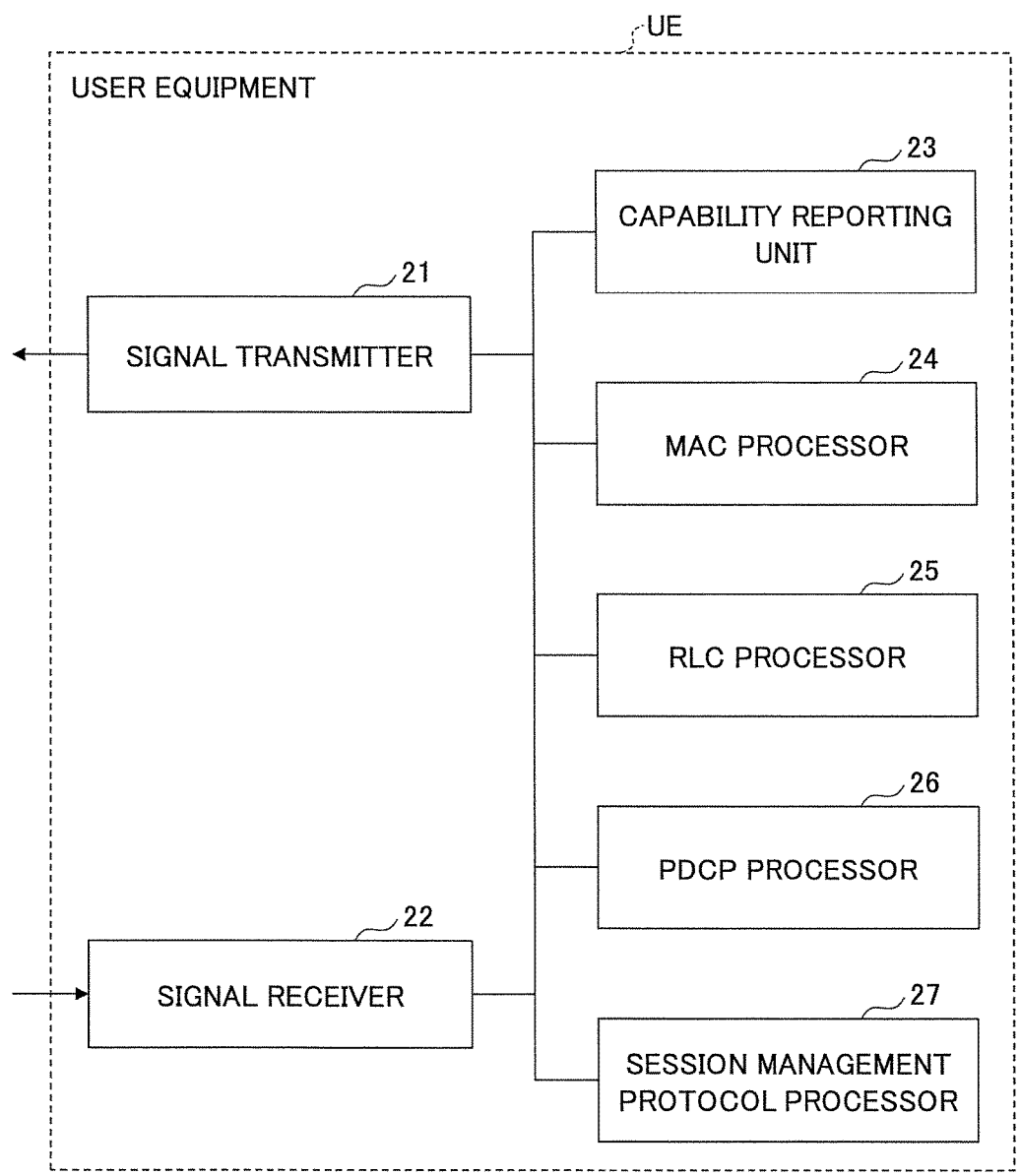
FIG. 6 is a diagram illustrating an example of a functional configuration of the user equipment according to the embodiment.

FIG. 6 is a diagram illustrating an example of a functional configuration of the base station according to the embodiment. As illustrated in FIG. 6, the user equipment UE includes a signal transmitter 21; a signal receiver 22; a capability reporting unit 23; a MAC processor 24; a RLC processor 25; a PDCP processor 26; and a session management protocol processor 27. Note that FIG. 6 only illustrates, in the user equipment UE, functional units particularly related to the embodiment of of the present invention; and it is assumed that functions, which are not depicted, for executing at least operations conforming to the LTE are included. Furthermore, the functional configuration illustrated in FIG. 6 is merely an example. The functional division and the names of the functional units may be any division and names, provided that the operation according to the embodiment can be performed.

The signal transmitter 21 includes a function for generating various types of physical layer signals from upper layer signals to be transmitted from the user equipment UE, and for wirelessly transmitting it.

The signal receiver 22 includes a function for wirelessly receiving various types of signals from the base station eNB, and for retrieving upper layer signals from the received physical layer signals.

The capability reporting unit 23 reports, to the base station eNB, the capability information indicating that the PDCP processor 26 is provided with processing capability for executing a process of transmitting, among a plurality of ACK packets, the most recently received ACK packet to the RLC processor 25.

The MAC processor 24 executes various types of processes related to the MAC layer. Furthermore, upon receiving the UL grant from the base station eNB, it transmits a transmission opportunity report to the RLC processor 25 so as to report, to the RLC processor 25, that transmission of an uplink signal is allowed.

The RLC processor 25 performs transmission and reception of RLC PDUs with the base station eNB, and executes various processes related to the RLC layer. Furthermore, upon receiving the transmission opportunity report from the MAC processor 24, it transmits the transmission opportunity report to the PDCP processor 26 so as to report, to the PDCP processor 26, that transmission of an uplink signal is allowed.

The PDCP processor 26 is provided with a buffer, which is implemented by a memory. Further, the PDCP processor 26 stores acknowledgement (an ACK packet or a SACK packet) received from the session management protocol processor 27 in the buffer. Further, upon receiving the transmission opportunity report from the RLC processor 25, the PDCP processor 26 transmits a PDCP PDU including, among the acknowledgements stored in the buffer, the most recently received acknowledgement to the RLC processor 25. Furthermore, the PDCP processor 26 may switch as to whether to execute the process, based on the instruction from the base station eNB, for example. Additionally, the PDCP processor 26 may switch as to whether to execute the process in units of radio bearers (DRBs) or in units of TCP sessions, based on the instruction from the base station eNB, for example.

The session management protocol processor 27 performs, for example, various types of processes (e.g., session management) during transmission and reception of the TCP packets, and performs various types of processes during transmission and reception of the IP packets.

<Hardware Configuration>

The block diagrams (FIG. 5 and FIG. 6) used for the description of the above-described embodiment illustrates blocks in units of functions. These functional blocks (components) are implemented by any combinations of hardware and/or software. Further, a method for implementing each functional block is not particularly limited. Namely, each functional block may be implemented by a single device that is physically and/or logically combined; or may be implemented by a plurality of devices by directly and/or indirectly (e.g., wired and/or wireless) connecting the two or more devices that are physically and/or logically separated.

Figure 7:
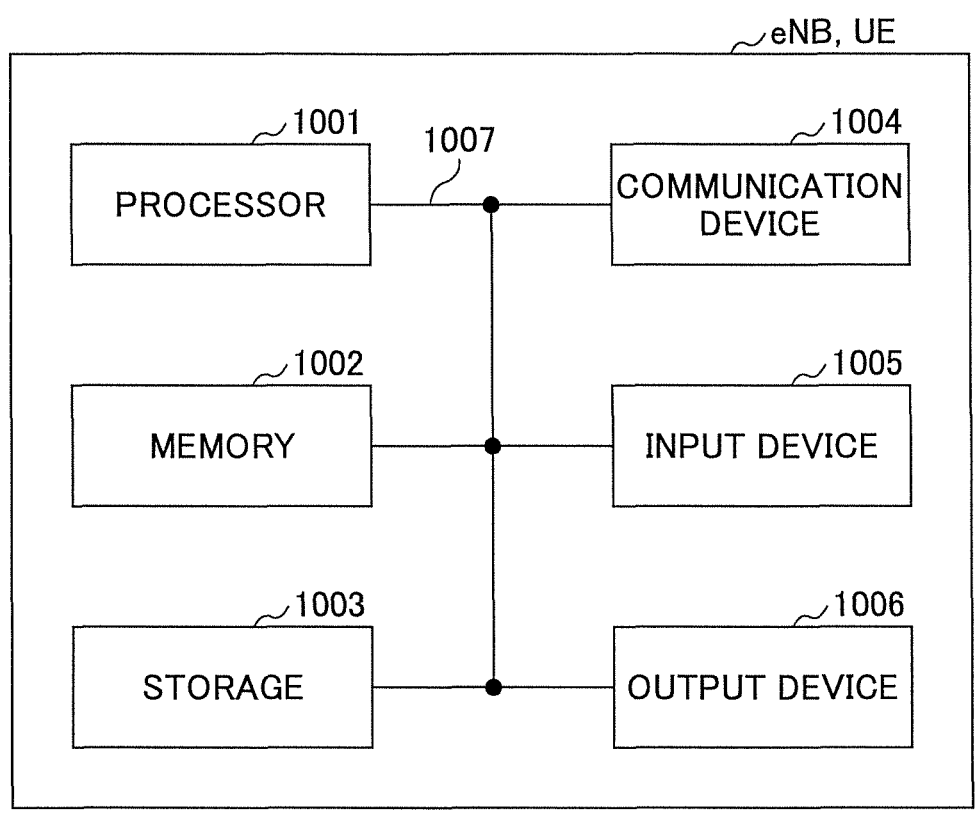
FIG. 7 is a diagram illustrating an example of a hardware configuration of the base station and the user equipment according to the embodiment.

For example, the base station eNB and the user equipment UE according to the embodiment of the present invention may function as computers for executing the process of the communication method according to the present invention. FIG. 7 is a diagram illustrating an example of the hardware configurations of the base station and the user equipment according to the embodiment. Each of the above-described base station eNB and the user equipment UE may be physically configured as a computer device including a processor 1001: a memory 1002: a storage 1003: a communication device 1004; an input device 1005; an output device 1006; a bus 1007, and so forth.

Note that, in the following description, the wording "device" may be replaced with a circuit, a device, a unit, and so forth. The hardware configurations of the base station eNB and the user equipment UE may be arranged to include one or more of the devices illustrated in the figure; or may be arranged not to include a part of the devices.

Each function of the base station eNB and the user equipment UE may be implemented by loading predetermined software (a program) onto hardware, such as a processor 1001 and a memory 1002, so that the processor 1001 performs operation to control communication by the communication device 1004, and reading and/or writing data in the memory 1002 and the storage 1003.

The processor 1002 controls the entire computer, for example, by operating an operating system. The processor 1001 may be formed of a central processing unit (CPU: Central Processing Unit) including an interface with peripheral devices; a controller; a processor, a resister, and so forth. For example, the signal transmitter 11, the signal receiver 12, the capability storage unit 13, and the instruction unit 14 of the base station eNB may be implemented by the processor 1001; and the signal transmitter 21, the signal receiver 22, the capability reporting unit 23, the MAC processor 24, the RLC processor 25, the PDCP processor 26, and the session management protocol processor 27 of the user equipment UE may be implemented by the processor 1001.

Furthermore, the processor 1001 reads out a program (a program code), a software module, or data from the storage 1003 and/or the communication device 1004 onto the memory 1002; and performs various types of processes according to these. As the program, a program is used which is for causing the computer to execute at least a part of the operation described in the above-described embodiment. For example, the signal transmitter 11, the signal receiver 12, the capability storage unit 13, and the instruction unit 14 of the base station eNB may be implemented by a control program that is stored in the memory 1002 and operated by the processor 1001; the signal transmitter 21, the signal receiver 22, the capability reporting unit 23, the MAC processor 24, the RLC processor 25, the PDCP processor 26, and the session management protocol processor 27 of the user equipment UE may be implemented by a control program that is stored in the memory 1002 and operated by the processor 1001; and the other functional blocks may be implemented in a similar manner. It is described that the above-described various types of processes are executed by the single processor 1001; however, these can be simultaneously or sequentially executed by two or more processors 1001. The processor 1001 may be implemented by one or more chips. Here, the program may be transmitted from a network via a telecommunication line.

The memory 1002 is a computer readable recording medium; and, for example, it can be formed of at least one of a ROM (Read Only Memory), an EPROM (Erasable Programmable ROM), an EEPROM (Electrically Erasable Programmable ROM), a RAM (Random Access Memory), and so forth. The memory 1002 may be referred to as a resister, a cache, a main memory (a main storage device), and so forth. The memory 1002 can store a program (a program code), a software module, and so forth that can be executed for implementing the communication method according to the embodiment of the present invention.

The storage 1003 is a computer readable recording medium; and, for example, it can be formed of at least one of an optical disk, such as a CD-ROM (Compact Disc ROM); a hard disk drive; a flexible disk; a magneto-optical disk (e.g., a compact disk, a digital versatile disk, a Blu-ray (registered trademark) disk); a smart card; a flash memory (e.g., a card, a stick, a key drive); a Floppy (registered trademark) disk; a magnetic strip, and so forth. The storage 1003 may be referred to as an auxiliary storage device. The above-described storage medium may be, for example, a database including the memory 1002 and/or the storage 1003; a server; or any other suitable medium.

The communication device 1004 is hardware (a transceiver device) for executing communication between computers via a wired and/or wireless network; and, for example, it can be referred to as a network device, a network controller, a network card, a communication module, and so forth. For example, the signal transmitter 11 and the signal receiver 12 of the base station eNB may be implemented by the communication device 1004; and the signal transmitter 21 and the signal receiver 22 of the user equipment UE may be implemented by the communication device 1004.

The input device 1005 is an input device that receives an input from outside (e.g., a keyboard, a mouse, a microphone, a switch, a button, a sensor, etc.). The output device 1006 is an output device for implementing output toward outside (e.g., a display, a speaker, a LED lamp, etc.). Note that the input device 1005 and the output device 1006 may have an integrated configuration (e.g., a touch panel).

Further, the devices, such as the processor 1001 and the memory 1002, are connected by a bus 1007 for communicating information. The bus 1007 may be formed of a single bus; or may be formed of buses which are different among devices.

Further, each of the base station eNB and the user equipment UE may be arranged to include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and a part of or all of the functional blocks may be implemented by the hardware. For example, the processor 1001 may be implemented by at least one of these hardware components.

<Conclusion>

As described above, according to the embodiment, there is provided user equipment for communicating with a base station in a mobile communication system including the base station and the user equipment, the user equipment including a PDCP layer processor provided with a storage unit that receives and stores a plurality of acknowledgement signals to be transmitted to the base station; and an RLC layer processor that transmits, to the PDCP layer processor, a signal transmission grant signal that indicates that transmission of an uplink signal is allowed, wherein, upon receiving the signal transmission grant signal, the PDCP layer processor transmits, to the RLC layer processor, an acknowledgement signal that is received most recently among the plurality of acknowledgement signals. By this user equipment UE, technology can be provided that can reduce an amount of data of radio signals transmitted between the user equipment and the base station.

Further, after transmitting the acknowledgement signal that is received most recently to the RLC layer processor, the PDCP layer processor may discard the plurality of acknowledgement signals stored in the storage unit. With this configuration, it can be prevented that the unnecessary acknowledgement signals are accumulated in the memory of the user equipment UE, so that the memory resources can be efficiently utilized.

Further, upon being instructed by the base station, the PDCP layer processor may execute the process of transmitting, to the RLC layer processor, the acknowledgement signal that is received most recently among the plurality of acknowledgement signals. With this configuration, the user equipment UE can cause the TCP process according to the embodiment to be operated in accordance with the instruction from the base station eNB.

Further, the PDCP layer processor may execute, for a radio bearer or a communication session indicated by the base station, the process of transmitting, to the RLC layer processor, the acknowledgement signal that is received most recently among the plurality of acknowledgement signals. With this configuration, the user equipment can cause the TCP process according to the embodiment to be operated in units of radio bearers, or in units of communication sessions. Additionally, with this configuration, the TCP process according to the embodiment can be caused to be operated while considering the balance between the processing capability of the user equipment UE itself and the amount of data of the radio signals to be reduced.

Further, the PDCP layer processor may include a reporting unit for reporting, to the base station, capability information indicating processing capability for executing the process of transmitting, to the RLC layer processor, the acknowledgement signal that is received most recently among the plurality of acknowledgement signals. With this configuration, the user equipment UE can cause the base station eNB to indicate a number of radio bearers or a number of communication sessions for which the TCP processes according to the embodiment are to be operated, within the range not exceeding the processing capability of the user equipment UE itself.

Further, according to the embodiment, there is provided a base station for communicating with user equipment in a mobile communication system including the base station and the user equipment, the base station including a receiver that receives capability information indicating processing capability for executing, in a PDCP layer of the user equipment, a process of transmitting, to an RLC layer, an acknowledgement signal that is received most recently among a plurality of acknowledgement signals; and an instruction unit that instruct the user equipment to execute, in the PDCP layer of the user equipment, the process of transmitting, to the RLC layer, the acknowledgement signal that is received most recently among the plurality of acknowledgement signals, based on the capability information. By this base station eNB, technology can be provided that can reduce an amount of data of radio signals transmitted between the user equipment and the base station.

Further, according to the embodiment, there is provided a communication method to be executed by user equipment for communicating with a base station in a mobile communication system including the base station and the user equipment, the communication method including a step of receiving and storing, in a storage unit in a PDCP layer, a plurality of acknowledgement signals to be transmitted to the base station; a step of transmitting, from an RLC layer to the PDCP layer, a signal transmission grant signal that indicates that transmission of an uplink signal is allowed; and a step of transmitting, to the RLC layer, an acknowledgement signal that is received most recently among the plurality of acknowledgement signals, in response to receiving the signal transmission grant signal by the PDCP layer. By this communication method, technology can be provided that can reduce an amount of data of radio signals transmitted between the user equipment and the base station.

Additionally, the "unit" in the configuration of each of the above-described devices may be replaced with "part," "circuit," "device," and so forth.

<Supplement to the Embodiment>

As described above, the embodiment can also be applied to another protocol, provided that the protocol is used for session management. For example, it can be applied also to a case where communication using QUIC (Quick UDP Internet Connection) is to be executed between the user equipment UE and the server, instead of the TCP. In this case, for example, the session management protocol processor 27 executes session management by using the QUIC. Further, the PDCP processor 26 stores acknowledgement of the QUIC in the buffer; and transmits, to the RLC layer processor 25, a PDCP PDU including the acknowledgement of the QUIC that is received most recently among the acknowledgements of the QUIC accumulated in the buffer, in response to receiving a transmission opportunity report from the RLC layer processor 25.

The configuration of each of the devices (the user equipment UE/the base station eNB) described in the embodiment may be a configuration that is implemented by executing a program by the CPU (processor) in the device including the CPU and the memory; a configuration that is implemented by hardware provided with a logic for the process described in the embodiment, such as a hardware circuit; or a mixture of programs and hardware.

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. In the sequence charts and the flowcharts described in the embodiment, the order can be replaced, provided that there is no contradiction. For the convenience of description, the user equipment UE and the base station eNB are described by using the functional block diagrams; however, such devices may be implemented in hardware, software, or combinations thereof. Each of the software to be operated by the processor included in the user equipment UE in accordance with the embodiment of the present invention, and the software to be operated by the processor included in the base station eNB in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present invention is not limited to the above-described embodiment; and various variations, modifications, alternatives, replacements, and so forth are included in the present invention without departing from the spirit of the present invention.

Note that, in the embodiment, the PDCP processor 26 is an example of the PROP layer processor. The RLC processor 25 is an example of the RLC layer processor. The buffer is an example of the storage unit. The transmission opportunity report is an example of the signal transmission grant signal. The capability reporting unit 23 is an example of the reporting unit. The signal receiver 12 is an example of the receiver. The instruction unit 14 is an example of the instruction unit.

This patent application is based upon and claims the benefit of priority of Japanese Patent Application No. 2015-104997 filed on May 22, 2015, and the entire contents of Japanese Patent Application No. 2015-104997 are incorporated herein by reference.

LIST OF REFERENCE SYMBOLS

UE: user equipment
eNB: base station
11: signal transmitter
12: signal receiver
13: capability storage unit
14: instruction unit
21: signal transmitter
22: signal receiver
23: capability reporting unit
24: MAC processor
25: RLC processor
26: PDCP processor
27: session management protocol processor
1001: processor
1002: memory
1003: storage
1004: communication device
1005: input device
1006: output device

The invention claimed is:

1. A user equipment for communicating with a base station in a mobile communication system including the base station and the user equipment, the user equipment comprising:
   a Packet Data Convergence Protocol (PDCP) layer processor provided with a storage unit that receives and stores a plurality of acknowledgement signals to be transmitted to the base station; and
   an Radio Link Control (RLC) layer processor that transmits, to the PDCP layer processor, a signal transmission grant signal that indicates that transmission of an uplink signal is allowed,
   wherein, upon receiving the signal transmission grant signal, the PDCP layer processor transmits, to the RLC layer processor, an acknowledgement signal that is received most recently among the plurality of acknowledgement signals.

2. The user equipment according to claim 1, wherein, after transmitting, to the RLC layer processor, the acknowledgement signal that is received most recently, the PDCP layer processor discards the plurality of acknowledgement signals stored in the storage unit.

3. The user equipment according to claim 2, wherein, upon being instructed by the base station, the PDCP layer processor executes the process of transmitting, to the RLC layer processor, the acknowledgement signal that is received most recently among the plurality of acknowledgement signals.

4. The user equipment according to claim 3, wherein the PDCP layer processor includes a reporting unit for reporting, to the base station, capability information indicating processing capability for executing the process of transmitting, to the RLC layer processor, the acknowledgement signal that is received most recently among the plurality of acknowledgement signals.

5. The user equipment according to claim 2, wherein the PDCP layer processor includes a reporting unit for reporting, to the base station, capability information indicating processing capability for executing the process of transmitting, to the RLC layer processor, the acknowledgement signal that is received most recently among the plurality of acknowledgement signals.

6. The user equipment according to claim 1, wherein, upon being instructed by the base station, the PDCP layer processor executes the process of transmitting, to the RLC layer processor, the acknowledgement signal that is received most recently among the plurality of acknowledgement signals.

7. The user equipment according to claim 6, wherein the PDCP layer processor executes, for a radio bearer or a communication session indicated by the base station, the process of transmitting, to the RLC layer processor, the acknowledgement signal that is received most recently among the plurality of acknowledgement signals.

8. The user equipment according to claim 7, wherein the PDCP layer processor includes a reporting unit for reporting, to the base station, capability information indicating processing capability for executing the process of transmitting, to the RLC layer processor, the acknowledgement signal that is received most recently among the plurality of acknowledgement signals.

9. The user equipment according to claim 6, wherein the PDCP layer processor includes a reporting unit for reporting, to the base station, capability information indicating processing capability for executing the process of transmitting, to the RLC layer processor, the acknowledgement signal that is received most recently among the plurality of acknowledgement signals.

10. The user equipment according to claim 1, wherein the PDCP layer processor includes a reporting unit for reporting, to the base station, capability information indicating processing capability for executing the process of transmitting, to the RLC layer processor, the acknowledgement signal that is received most recently among the plurality of acknowledgement signals.

11. A base station for communicating with user equipment in a mobile communication system including the base station and the user equipment, the base station comprising:

a receiver that receives capability information indicating processing capability for executing, in a Packet Data Convergence Protocol (PDCP) layer of the user equipment, a process of transmitting, to an Radio Link Control (RLC) layer, an acknowledgement signal that is received most recently among a plurality of acknowledgement signals; and an instruction unit that instructs the user equipment to execute, in the PDCP layer of the user equipment, the process of transmitting, to the RLC layer, the acknowledgement signal that is received most recently among the plurality of acknowledgement signals, based on the capability information.

12. A communication method to be executed by user equipment for communicating with a base station in a mobile communication system including the base station and the user equipment, the communication method comprising:

a step of receiving and storing, in a storage unit in a Packet Data Convergence Protocol (PDCP) layer, a plurality of acknowledgement signals to be transmitted to the base station;

a step of transmitting, from an Radio Link Control (RLC) layer to the PDCP layer, a signal transmission grant signal that indicates that transmission of an uplink signal is allowed; and a step of transmitting, to the RLC layer, an acknowledgement signal that is received most recently among the plurality of acknowledgement signals, in response to receiving the signal transmission grant signal by the PDCP layer.

\* \* \* \* \*